United States Patent
Chang

(10) Patent No.: US 11,078,827 B2
(45) Date of Patent: Aug. 3, 2021

(54) PRE-CHAMBER IGNITION SYSTEM HAVING IGNITER WITH GAS ORIFICE STRUCTURED FOR PRE-EXPANDING OUTGOING COMBUSTION GASES

(71) Applicant: Caterpillar Inc., Deerfield, IL (US)

(72) Inventor: David Yu Zhang Chang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/157,793

(22) Filed: Oct. 11, 2018

(65) Prior Publication Data

US 2020/0116074 A1 Apr. 16, 2020

(51) Int. Cl.
| | |
|---|---|
| F02B 19/18 | (2006.01) |
| F02B 19/06 | (2006.01) |
| F02B 19/14 | (2006.01) |
| F02B 19/10 | (2006.01) |

(52) U.S. Cl.
CPC .............. *F02B 19/18* (2013.01); *F02B 19/06* (2013.01); *F02B 19/14* (2013.01); *F02B 19/108* (2013.01)

(58) Field of Classification Search
CPC .................................................. F02B 19/00–18
USPC .................................................. 123/253–293
See application file for complete search history.

(56) References Cited

U.S. PATENT DOCUMENTS

| | | | |
|---|---|---|---|
| 4,917,307 A | 4/1990 | Baxter et al. | |
| 5,024,184 A * | 6/1991 | Nagano | F02B 19/14 123/298 |
| 5,024,193 A * | 6/1991 | Graze, Jr. | F02B 19/18 123/259 |
| 5,392,744 A * | 2/1995 | Regueiro | F02B 19/18 123/262 |
| 5,556,034 A | 9/1996 | Sakakida et al. | |
| 5,862,792 A | 1/1999 | Paul et al. | |
| 5,924,402 A * | 7/1999 | Regueiro | F02B 19/108 123/254 |
| 6,302,067 B1 * | 10/2001 | Merritt | F02B 19/06 123/48 D |
| 9,593,622 B2 * | 3/2017 | Kim | F02B 19/18 |
| 2003/0116121 A1 * | 6/2003 | Agama | F02B 1/12 123/259 |
| 2003/0213461 A1 * | 11/2003 | Regueiro | F02B 19/08 123/262 |
| 2005/0072400 A1 * | 4/2005 | Kojic | F02B 5/00 123/256 |
| 2007/0051828 A1 | 3/2007 | Cooke | |
| 2013/0327033 A1 | 12/2013 | McBride et al. | |
| 2014/0158083 A1 * | 6/2014 | Lee | F02B 19/12 123/275 |
| 2014/0175192 A1 | 6/2014 | Hou | |

(Continued)

*Primary Examiner* — Logan M Kraft
*Assistant Examiner* — Robert A Werner
(74) *Attorney, Agent, or Firm* — Brannon Sowers & Cracraft

(57) ABSTRACT

An ignition system for a gaseous fuel engine includes an igniter and an actuator structured to apply an actuating force to a piston within the igniter, to autoignite an ignition charge of fuel and air within the igniter. A housing of the igniter includes a gas orifice having a flow area that is increased between a combustion pre-chamber in the igniter and a main combustion chamber in the engine, to limit velocity of outgoing combustion gases to below a threshold velocity for engine mis-fire.

18 Claims, 4 Drawing Sheets

(56) References Cited

U.S. PATENT DOCUMENTS

| | | | |
|---|---|---|---|
| 2014/0331960 A1* | 11/2014 | Lee | F02B 19/06 |
| | | | 123/275 |
| 2015/0369192 A1 | 12/2015 | Ge et al. | |
| 2016/0069250 A1* | 3/2016 | Loetz | F02B 19/108 |
| | | | 123/292 |
| 2016/0333770 A1* | 11/2016 | Kreuter | F02B 19/108 |

* cited by examiner

PRE-CHAMBER IGNITION SYSTEM HAVING IGNITER WITH GAS ORIFICE STRUCTURED FOR PRE-EXPANDING OUTGOING COMBUSTION GASES

TECHNICAL FIELD

The present disclosure relates generally to an ignition system for an engine, and more particularly to an igniter having a gas orifice for conveying autoignited combustion gases into a main combustion chamber that is structured for pre-expansion of the outgoing combustion gases to inhibit mis-firing the engine.

BACKGROUND

Combustion engines, including spark-ignited engines, compression ignition engines, and still others operate by producing a controlled combustion reaction within the cylinder to drive a piston coupled with a crankshaft. Engineers have experimented with a wide variety of different fuel types, engine configurations, combustion recipes, and ignition strategies for well over a century. Concerns over emissions, costs, and supply, amongst other concerns relating to traditional fuels such as petroleum distillate fuels, have led to increased interest and exploitation of certain gaseous fuels in recent years, including natural gas, landfill gas, biogas, propane, and various blends of these. Such fuels may be combusted in some engines at a relatively higher stoichiometric air-to-fuel ratio, in other words a relatively clean fuel-and-air mixture. Known combustion ignition strategies for gaseous fuels relying upon a sparkplug or compression ignition can fail to properly ignite, producing engine knock or other problems, or may require equipment or operating techniques that are not cost effective or are otherwise undesired.

Pre-chamber ignition techniques employ a device coupled with the engine that ignites a fuel-and-air mixture in a pre-chamber separate from the main combustion chamber, thenceforth delivering a jet of hot, combusting gases to the main combustion chamber to produce a more uniform, higher temperature, and robust combustion reaction as compared to traditional strategies. In one typical pre-chamber design an ignition charge of fuel and air is urged into the pre-chamber by way of movement of the engine piston in a compression stroke. In another pre-chamber strategy a separate supply of fuel, the same fuel that is combusted in the main combustion chamber or a different fuel, is provided for the pre-chamber ignition device. One example pre-chamber device is known from United States Patent Application Publication No. 2018/0087447.

SUMMARY OF THE INVENTION

In one aspect, an ignition system for an engine includes an igniter having an igniter housing. The igniter housing has an inner housing surface defining a combustion pre-chamber, an outer housing surface, and a piston movable within the igniter housing between a retracted position and an advanced position. The ignition system further includes an actuator structured to apply an actuating force to the piston, such that the piston is moved toward the advanced position to increase a pressure of an ignition charge of fuel and air within the combustion pre-chamber to an autoignition threshold. The igniter housing further includes a gas orifice extending between a first opening formed in the inner housing surface and in fluid communication with the combustion pre-chamber, and a second opening formed in the outer housing surface. The gas orifice has a flow area that is increased between the first opening and the second opening to pre-expand outgoing combustion gases of the ignition charge.

In another aspect, a gaseous fuel engine includes a supply of gaseous fuel, an engine housing having a main combustion chamber formed therein, and an ignition system. The ignition system includes an igniter having an igniter housing coupled to the engine housing, the igniter housing having a combustion pre-chamber formed therein, and a gas orifice fluidly connecting the combustion pre-chamber to the main combustion chamber. The igniter further includes a piston movable within the igniter housing between a retracted position and an advanced position, and an actuator structured to apply an actuating force to the piston to move the piston toward the advanced position. The gas orifice has a flow area that is increased between the combustion pre-chamber and the main combustion chamber to pre-expand outgoing combustion gases of an ignition charge of fuel and air autoignited in the pre-chamber.

In still another aspect, a method of operating an engine includes moving an engine piston in an engine toward a top dead center position to increase a pressure of a main charge of fuel and air within a combustion chamber. The method further includes moving an igniter piston in an igniter toward an advanced position to increase a pressure of an ignition charge of fuel and air within a combustion pre-chamber to an autoignition threshold and conveying combustion gases of the ignition charge through a gas orifice in the igniter that fluidly connects the combustion pre-chamber with the main combustion chamber. The method still further includes igniting the main charge within the main combustion chamber by way of the combustion gases of the ignition charge, and pre-expanding the combustion gases within the gas orifice, such that a velocity of the combustion gases after exiting the gas orifice is less than a threshold velocity for engine mis-fire.

DETAILED DESCRIPTION

Figure 1:
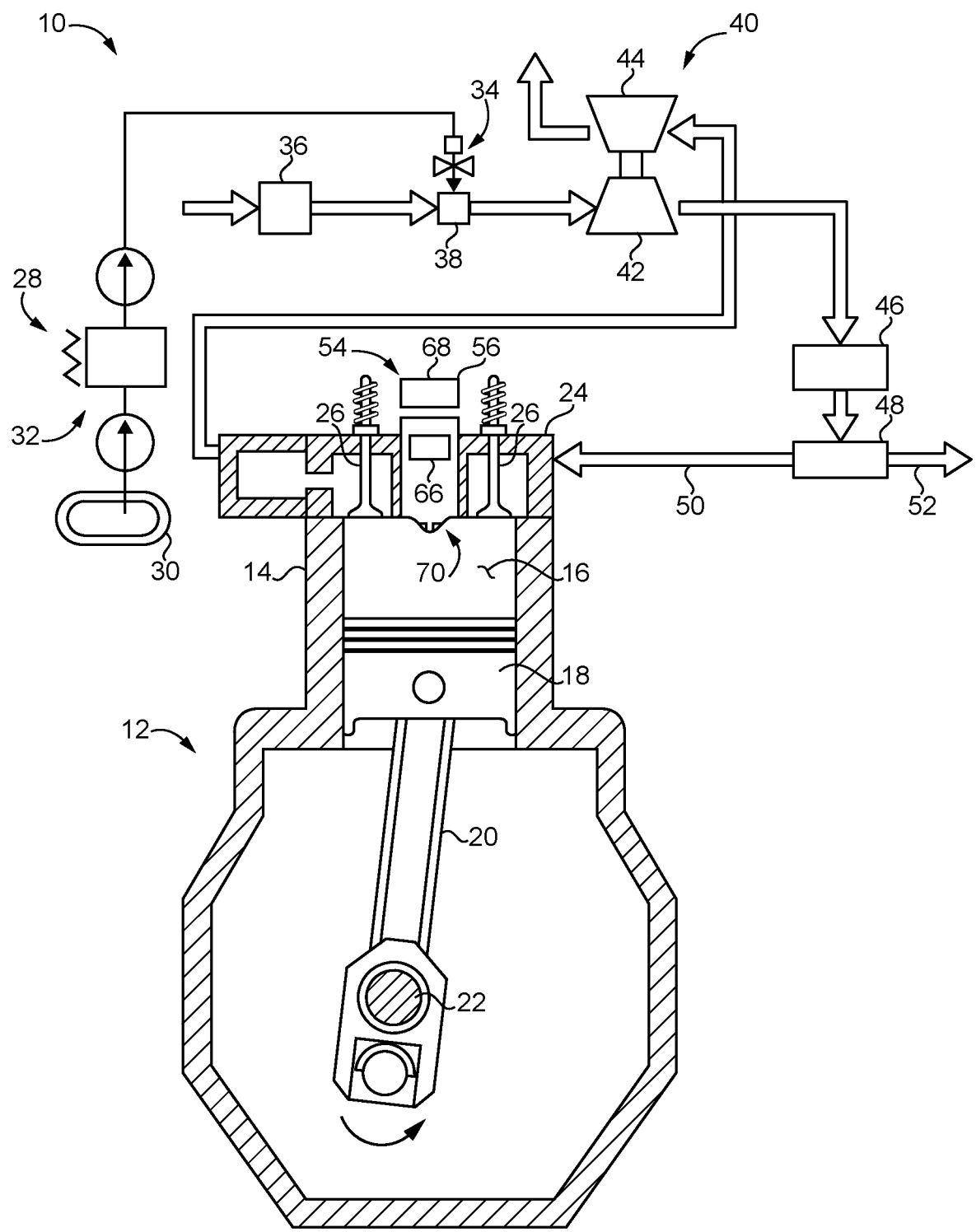
FIG. 1 is a partially sectioned diagrammatic view of an engine system, according to one embodiment.

Referring to FIG. 1, there is shown an engine system 10, according to one embodiment, and including an internal combustion engine 12 having an engine housing 14 with a cylinder or main combustion chamber 16 formed therein. A piston 18 is positioned within cylinder 16, which could be equipped with a cylinder liner, and movable between a top dead center position and a bottom dead center position in a conventional four-stroke engine cycle. A connecting rod 20 couples piston 18 with a crankshaft 22. An engine head 24 is attached to engine housing 14 and has a plurality of gas exchange valves 26 movable therein to control intake and exhaust of engine 12 in a generally conventional manner.

Engine 12 could include any number of cylinders each equipped with a piston and arranged in any suitable configuration such as an in-line configuration or a V-configuration. Engine 12 may include a gaseous fuel engine structured to operate on any of a variety of gaseous fuels that have a gaseous state at standard temperature and pressure, including natural gas, methane, propane, biogas, landfill gas, mine gas, blends of these or still others. To this end, engine system 10 includes a fuel system 28 having a gaseous fuel supply 30, and vaporization and pressurization equipment in the nature of a vaporizer and at least one pump, structured to receive gaseous fuel in a pressurized gaseous state or a cryogenically stored liquid state, and convey the gaseous fuel to engine 12 for combustion in cylinder 16 and other cylinders thereof. Engine system 10 further includes an air inlet 36 structured to receive fresh intake air, and a turbocharger 40 positioned fluidly between air inlet 36 and engine housing 14. Turbocharger 40 can include a compressor 42, and a turbine 44. An aftercooler 46 or the like may be positioned fluidly between turbocharger 40 and an intake manifold 48. An intake runner 50 extends from intake manifold 48 to engine housing 14. A second intake runner 52 is also illustrated and will be understood to extend to another cylinder (not shown) of engine 12. In the illustrated embodiment a gas inlet 38 is positioned downstream air inlet 36 and receives gaseous fuel by way of a gaseous fuel admission valve 34. Accordingly, operation of compressor 42 compresses a mixture of air and gaseous fuel. Alternative strategies are contemplated within the scope of the present disclosure including, for instance, injection of gaseous fuel into intake manifold 48, into intake runner 50, or injection directly into cylinder 16. In one practical implementation strategy operation of engine system 10 can include operation using a relatively stoichiometrically lean mixture of gaseous fuel and air having an equivalence ratio of 1, or less, and in some embodiments an equivalence ratio of about 0.6, or less. As noted above, stoichiometrically lean fuel-and-air mixtures can sometimes be relatively challenging to reliably and optimally ignite, and pre-chamber ignition devices have been employed for engine ignition purposes in this context. It has also been observed that conventional pre-chamber ignition devices can suffer from certain shortcomings relative to certain applications.

Figure 2:
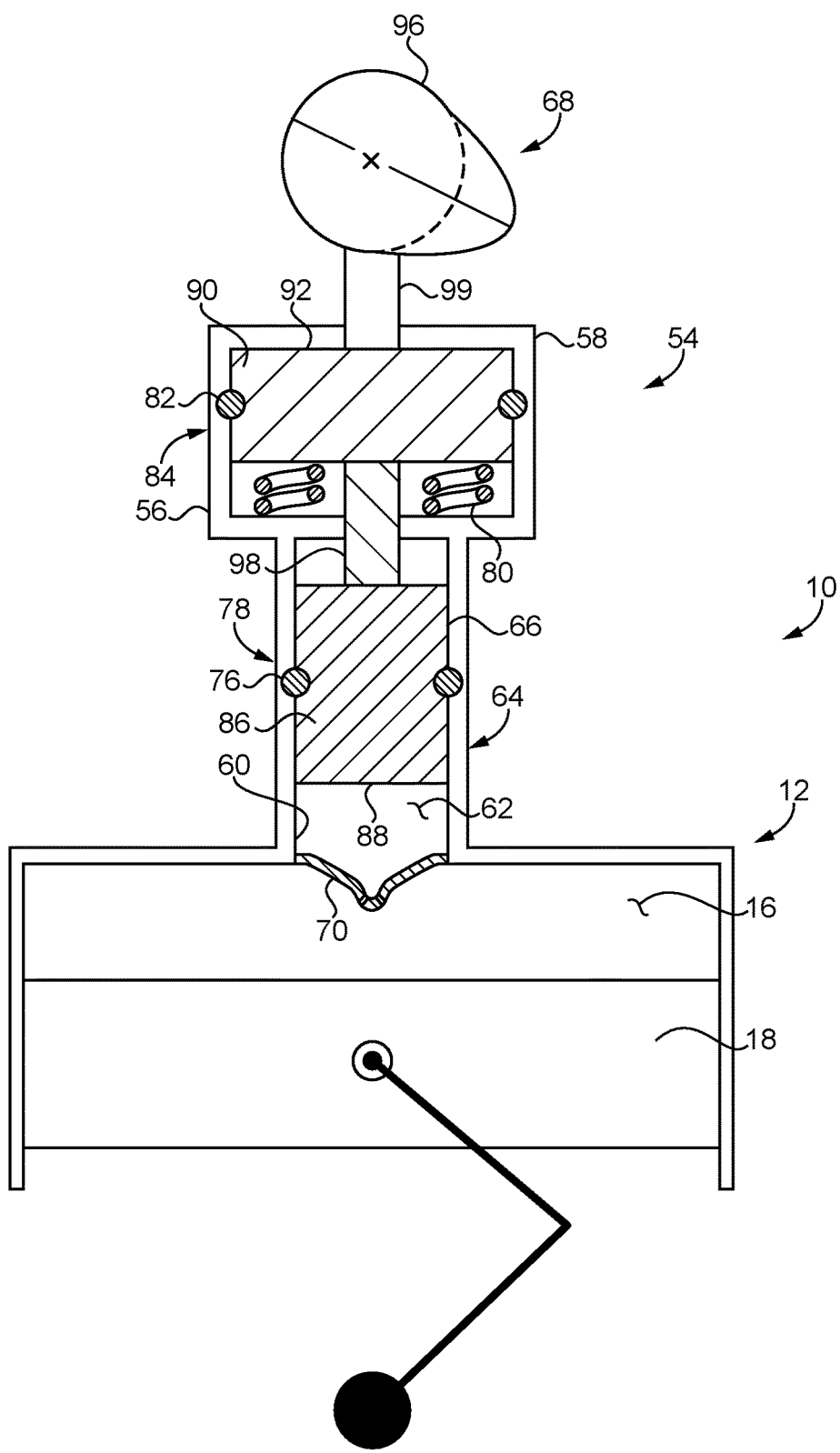
FIG. 2 is a partially sectioned diagrammatic view of a portion of the engine system of FIG. 1, according to one embodiment.
Figure 4:
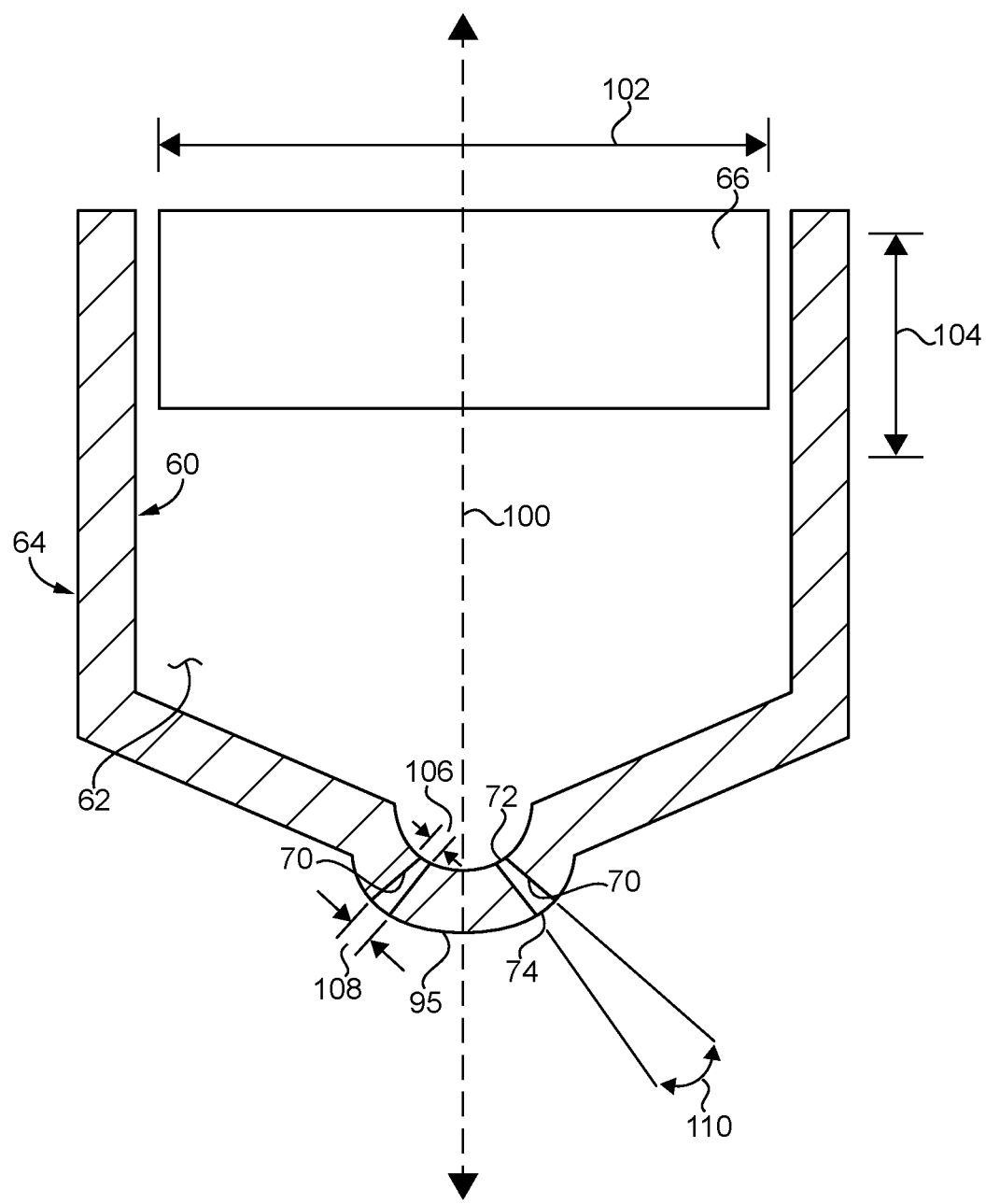
FIG. 4 is a sectioned diagrammatic view of a portion of an igniter in an ignition system, according to one embodiment.

Referring also now to FIG. 2, engine system 10 also includes an ignition system 54 having an igniter 56 with an igniter housing 58 coupled to engine housing 14. Igniter housing 58 has an inner surface 60 defining a combustion pre-chamber 62, an outer housing surface 64, and an igniter piston 66 movable within igniter housing 58 between a retracted position and an advanced position. Ignition system 54 also includes an actuator 68 structured to apply an actuating force to piston 66, such that piston 66 is moved toward the advanced position to increase a pressure of an ignition charge of fuel and air within combustion pre-chamber 62 to an autoignition threshold. In a practical implementation the ignition charge of fuel and air will be conveyed into combustion pre-chamber 62 from cylinder 16 in response to movement of piston 18 toward a top dead center position in a compression stroke, however, in other embodiments a different mechanism or configuration for delivering fuel directly into combustion pre-chamber 62 might be used. Igniter housing 58 further includes a gas orifice 70 fluidly connecting combustion pre-chamber 62 to main combustion chamber 16. Referring also now to FIG. 4, gas orifice 70 can include one of a plurality of gas orifices formed in igniter housing 58. In a practical implementation, gas orifices 70 can be arranged radially symmetrically about a longitudinal axis 100 defined by igniter housing 58, and can be oriented at a spray or discharge angle relative to longitudinal axis 100 that is less than 45°, however, the present disclosure is not thereby limited. Discussion and description herein of gas orifice 70 in the singular should be understood to refer by way of analogy to any of the other of the plurality of gas orifices, as the plurality of gas orifices may be substantially identical to one another. Embodiments where gas orifices differ in geometry from one another, are at different spray angles, axial locations, or still vary from uniformity are nevertheless contemplated herein. Gas orifice 70 has a flow area that is increased between first opening 72 and second opening 74 to pre-expand outgoing combustion gases of the ignition charge. In the illustrated embodiment, inner opening 72 has a first diameter 106, and outer opening 74 has a second diameter 108 that is greater than first diameter 106. A size of outer opening 74 is thus relatively larger or greater than a size of inner opening 72 and gas orifice 70 has a tapered shape from inner opening 72 to outer opening 74, with the taper formed by gas orifice 70 opening in an outward direction. A ratio of the size of outer opening 74 to the size of inner opening 72 may be from about 1.5:1 to about 2:1. An angle 110 defined by the taper formed by gas orifice 70 may be less than 45 degrees, and typically less than 30 degrees approximately as depicted in FIG. 4. A tip 95 of igniter housing 48, which could include a bulb, extends into cylinder 16.

Returning to FIG. 2, ignition system 54 further includes a sealing element 76 extending circumferentially around piston 66 and forming a seal 78 between piston 66 and igniter housing 58. Sealing element 76 could include a metallic piston ring or the like, or a non-metallic O-ring, or still another sealing element separate from or formed integrally with piston 66 itself or with igniter housing 58. It will be appreciated that seal 78 may be subjected to pressures approaching or as great as a pressure produced in combustion pre-chamber 62 in response to ignition and combustion of an ignition charge of gaseous fuel and air therein. A biaser 80 is further provided that biases piston 66 in opposition to an actuating force produced by actuator 68. Ignition system 54 further includes a second sealing element 82 extending circumferentially around piston 66 and forming a second seal 84 between piston 66 and igniter housing 58. In the illustrated embodiment, piston 66 includes a first piston head 86 having a first piston end face 88 exposed to combustion pre-chamber 62, and a second piston head 90 attached to first piston head 86 and having a second piston end face 92. First seal 78 may be formed between first piston head 86 and igniter housing 58, and second seal 84 may be formed between second piston head 90 and igniter housing 58. First piston head 86 may have a diameter dimension 102 as shown in FIG. 4 that is less than a diameter dimension of second piston head 90. First piston head 86 and second piston head 90 may be attached by way of a connector rod 98 or the like, or could be formed integrally with one another. Biaser 80 may be held captive between second piston head 90 and igniter housing 58 as shown.

As noted, piston 66 includes a first piston end face 88, and a second piston end face 92. Actuator 68 may include a mechanical actuator, meaning kinetic not electro-magnetic force is used to move piston 66, and structured to apply the actuating force to second piston end face 92, or to a component associated to move with or against second piston end face 92. In the embodiment of FIG. 2, actuator 68 includes a cam actuator having a rotatable cam 96 and a tappet 99 or the like that is attached to or otherwise interacts with second piston end face 92. Tappet 99 or an analogous piece of hardware could be understood to itself include the second piston end face that is directly contacted by cam 96. Piston 66 is thus fixed to move within ignitor housing 58 in response to rotation of rotatable cam 96. Cam 96 could include a cam upon a camshaft that is rotated in response to rotation of crankshaft 22 in a generally conventional manner at half engine speed. Faces of cam 96 (not numbered) could be shaped such that a linear travel speed of piston 66 that is produced in response to rotation of cam 96 is greater than a linear travel speed of engine piston 18. A travel distance 104 shown in FIG. 4 might be about 15 millimeters, whereas diameter dimension 102 might be about 20 millimeters, however, the present disclosure is not thereby limited. It is further contemplated that cam 96 may be shaped such that a peak pressure in combustion pre-chamber 62 is achieved a few degrees, such as about 10 degrees or less, before a top dead center position of engine piston 18 at the end of a compression stroke. As used herein the term "about" can be understood in the context of conventional rounding to a consistent number of significant digits. Accordingly, "about 10" means from 9.5 to 10.4 and so on.

Figure 3:
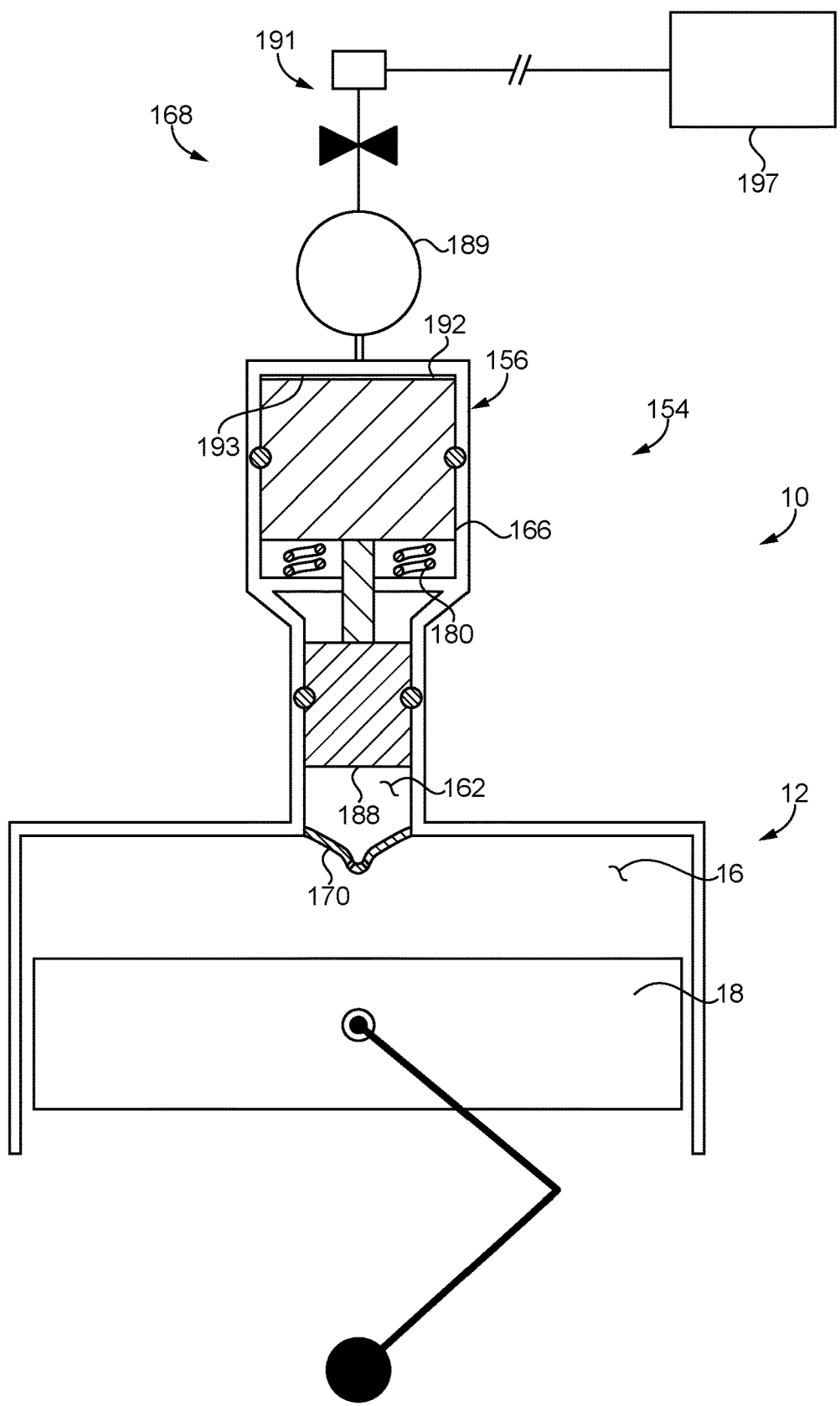
FIG. 3 is a partially sectioned diagrammatic view of an alternative configuration for the portion of the engine shown in FIG. 2, according to one embodiment.

Referring now to FIG. 3, there is shown another configuration of engine system 10 where an alternative ignition system 154 is used. It will be appreciated that certain of the features and elements of ignition system 154 are similar or identical to those described in connection with ignition system 54. Ignition system 154 includes an igniter 156, with a piston 166 movable to increase a pressure within a combustion pre-chamber 162 to an autoignition threshold for a mixture of a fuel and air, and having a first piston end face 188 and a second piston end face 192. A gas orifice 170 configured analogously to gas orifice 70 discussed elsewhere herein fluidly connects combustion pre-chamber 162 with cylinder/main combustion chamber 16. A biaser 180 is analogous to biaser 80 discussed above. Ignition system 154 also includes a hydraulic actuator 168, with second piston end face 192 including a wetted hydraulic actuation surface exposed to a hydraulic chamber 193. Actuator 168 also includes a hydraulic reservoir or supply 189, and a valve 191 that may be electrically actuated and coupled with a conventional and suitably programmed electronic control unit or computer 197. Valve 191 may have at least two valve configurations and is structured to be adjusted between its valve configurations to fluidly connect hydraulic reservoir 189 to a high-pressure fluid source (not shown) or a low-pressure fluid space or source (not shown), to selectively increase a pressure in hydraulic chamber 193 or selectively decrease the pressure in hydraulic chamber 193 to actuate piston 166. Valve 191 could be an assembly of valves. Providing hydraulic reservoir 189 in relatively close proximity to hydraulic chamber 193 can assist in providing sufficient flow to relatively rapidly fill hydraulic chamber 193 to drive piston 166 and thereby autoignite fuel and air in combustion pre-chamber 162.

INDUSTRIAL APPLICABILITY

Referring to the drawings generally, operating engine 12 and engine system 10 can include moving engine piston 18 toward a top dead center position to increase a pressure of a main charge of fuel and air within main combustion chamber 16. Operating engine 12 and engine system 10 further includes moving igniter piston 66, 166, at an appropriate timing, toward an advanced position to increase a pressure of an ignition charge of fuel and air within combustion pre-chamber 62, 162 to an autoignition threshold. Combustion gases of the autoignited ignition charge can be conveyed through gas orifice 70, 170 in igniter 56, 156 that fluidly connects combustion pre-chamber 62, 162 with main combustion chamber 16. The main charge of fuel and air within main combustion chamber 16 is ignited by way of the combustion gases of the ignition charge. As noted above, combustion gases may be pre-expanded within gas orifice 70, 170. By providing a suitable geometry of gas orifice 70, 170, the combustion gases of the ignition charge can commence expanding within gas orifice 70, 170 prior to entering main combustion chamber 16, in turn reducing a velocity or limiting a velocity of the combustion gases after exiting gas orifice 70, 170 to less than a threshold velocity for engine mis-fire. Consistent with other embodiments discussed herein, conveying of the combustion gases can include conveying the combustion gases from inner opening 72 that is relatively small in size to outer opening 74 that is relatively larger in size.

In combustion pre-chambers according to the present disclosure, when the ignition charge reaches an autoignition threshold in response to moving piston 66, 166, the pressure and temperature of the ignition charge mixture increases relatively rapidly, causing all or substantially all of the fuel within the combustion pre-chamber to ignite and start burning simultaneously. The substantially simultaneous combustion of all of the fuel causes pressure in combustion pre-chamber 62, 162 to rise quite rapidly and push the hot combustion gases into main combustion chamber 16 through orifices 70, 170 at typically supersonic velocity. The relatively high velocity of the hot combustion gases can result in a rapid transfer of heat and energy dissipation between the hot combustion gases of the ignition charge and the relatively cold cylinder gas. The rapid energy dissipation can cause the hot combustion gases to drop in temperature and energy quickly, and thereby fail to ignite or properly ignite the main charge. Providing for pre-expansion, meaning expansion of the combustion gases prior to entering main combustion chamber 16, the divergent or otherwise configured orifices of the present disclosure can reduce the injection velocity. The combustion gases are thus retarded or limited in velocity and expected to hold more energy for igniting the main charge. A threshold velocity for engine mis-fire can be determined empirically, or at least geometry of one or more gas orifices that limit velocity of hot combustion gases to less than the threshold velocity for engine mis-fire can be determined empirically. A wider taper can be expected to produce relatively more rapid expansion of the combustion gases within gas orifice 70, 170, and vice versa. It is also expected that other factors such as fuel energy content, engine (and/or pre-chamber) compression ratio, total flow area for combustion gases out of a pre-chamber, and potentially still other factors can also bear upon the extent to which pre-expansion optimally occurs to inhibit or limit the likelihood of engine mis-fire.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An ignition system for an engine comprising:
an igniter including an igniter housing defining a longitudinal axis and having an inner housing surface defining a combustion pre-chamber, an outer housing surface, and a piston movable within the igniter housing between a retracted position and an advanced position;
the piston including a first piston head having a piston end face exposed to the combustion pre-chamber, and a second piston head attached to the first piston head and having a second piston end face;
an actuator structured to apply an actuating force to the piston, such that the piston is moved toward the advanced position to increase a pressure of an ignition charge of fuel and air within the combustion pre-chamber to an autoignition threshold;
a biaser positioned between the first piston head and the second piston head and biasing the piston in opposition to the actuating force;
the igniter housing further including a tip structured to extend into a main combustion chamber in the engine, and a plurality of gas orifices distributed circumferentially around the longitudinal axis and oriented at spray angles transverse to the longitudinal axis, and each extending between an inner opening formed in the inner housing surface within the tip and in fluid communication with the combustion pre-chamber, and an outer opening formed in the outer housing surface within the tip; and
a size of the outer opening of each of the plurality of gas orifices is greater than a size of the respective inner opening, and each of the plurality of gas orifices having a tapered shape from the inner opening to the outer opening, such that a flow area thereof is increased between the respective inner opening and outer opening to pre-expand outgoing combustion gases of the ignition charge.

2. The ignition system of claim 1 further comprising a sealing element extending circumferentially around the piston and forming a seal between the piston and the igniter housing.

3. The ignition system of claim 2 further comprising a second sealing element extending circumferentially around the piston and forming a second seal between the piston and the igniter housing.

4. The ignition system of claim 3 wherein
the first seal is formed between the first piston head and the igniter housing, and the second seal is formed between the second piston head and the igniter housing.

5. The ignition system of claim 4 wherein the biaser is held captive between the second piston head and the igniter housing.

6. The ignition system of claim 1 wherein the actuator includes a mechanical actuator structured to apply the actuating force to the second piston end face.

7. The ignition system of claim 6 wherein the actuator is a hydraulic actuator and the second piston end face includes a wetted hydraulic actuation surface.

8. The ignition system of claim 6 wherein the actuator is a cam actuator having a rotatable cam, and the piston is fixed to move in response to rotation of the rotatable cam.

9. The ignition system of claim 1 wherein a ratio of the size of the outer opening to the size of the inner opening is from about 1.5:1 to about 2:1.

10. A gaseous fuel engine comprising:
a supply of gaseous fuel;
an engine housing having a main combustion chamber formed therein, and a main piston movable in the main combustion chamber;
a gaseous fuel admission valve fluid connected to the supply of gaseous fuel, and coupled to the engine housing to admit gaseous fuel by way of one of intake injection or direct injection into the main combustion chamber;
an ignition system including an igniter having an igniter housing coupled to the engine housing, the igniter housing having a combustion pre-chamber formed therein, and an igniter tip having a gas orifice formed therein and fluidly connecting the combustion pre-chamber to the main combustion chamber;
the igniter further including an igniter piston movable within the igniter housing between a retracted position and an advanced position, the igniter piston defining a centrally located axis of reciprocation and having a piston end face;
the igniter further including an actuator structured to apply an actuating force to the igniter piston to move the igniter piston from the retracted position to the advanced position, and a biaser biasing the piston in opposition to the actuating force; and
the gas orifice having a flow area that is increased between the combustion pre-chamber and the main combustion chamber to pre-expand outgoing combustion gases of an ignition charge of fuel and air autoignited in the combustion pre-chamber;
the piston is movable a travel distance from the retracted position to the advanced position to increase a pressure of the ignition charge of fuel and air to an autoignition threshold; and
the combustion pre-chamber is unobstructed, such that the centrally located axis of reciprocation extends through the unobstructed combustion pre-chamber from the piston end face to the igniter tip, and the gas orifice continuously fluidly connects the combustion pre-chamber to the main combustion chamber throughout the travel distance of the igniter piston.

11. The engine of claim 10 wherein the gas orifice is one of a plurality of gas orifices each having a flow area that is increased between the combustion pre-chamber and the main combustion chamber.

12. The engine of claim 11 further comprising a sealing element extending circumferentially around the igniter piston and forming a fluid seal between the igniter piston and the igniter housing.

13. The engine of claim 11 wherein each of the plurality of gas orifices forms a taper that opens outwardly from the combustion pre-chamber to the main combustion chamber.

14. The engine of claim 13 wherein each of the plurality of gas orifices has an inner opening formed in the inner housing surface, and an outer opening, and a ratio of a size of the outer opening to a size of the inner opening is from about 1.5:1 to about 2:1.

15. The engine of claim 10 wherein the actuator includes a hydraulic actuator, and further comprising a valve adjustable between at least two different configurations to vary a supply of hydraulic fluid to or from the hydraulic actuator.

16. The engine of claim 10 wherein the actuator includes a cam actuator having a rotatable cam.

17. A method of operating an engine comprising:
conveying a gaseous fuel admitted by one of intake injection or direction injection, and air, into a main combustion chamber in the engine to form a main charge of the gaseous fuel and air in the main combustion chamber;

moving an engine piston in the engine toward a top dead center position to increase a pressure of the main charge of the gaseous fuel and air within the main combustion chamber in a compression stroke in a four-stroke engine cycle of the engine;

forming an ignition charge in a combustion pre-chamber in an igniter from gaseous fuel and air of the main charge conveyed from the main combustion chamber into the combustion pre-chamber based on the moving of the engine piston;

moving an igniter piston in the igniter toward an advanced position to increase a pressure of the ignition charge within the combustion pre-chamber to an autoignition threshold;

conveying combustion gases of the ignition charge through the gas orifice in the igniter to the main combustion chamber;

igniting the main charge within the main combustion chamber by way of the combustion gases of the ignition charge;

pre-expanding the combustion gases within the gas orifice;

limiting a velocity of the combustion gases after exiting the gas orifice, by way of the pre-expansion of the combustion gases within the gas orifice, to less than a threshold velocity for engine mis-fire; and fluidly connecting the main combustion chamber to the combustion pre-chamber by way of the gas orifice continuously throughout the four-stroke engine cycle of the engine.

18. The method of claim 17 wherein the conveying of the combustion gases further includes conveying the combustion gases from an inner opening of the gas orifice that is relatively smaller in size to an outer opening of the gas orifice that is relatively larger in size.

\* \* \* \* \*